United States Patent
Cao et al.

(10) Patent No.: US 12,305,758 B2
(45) Date of Patent: May 20, 2025

(54) SEALING STRUCTURE FOR ROBOT JOINT AND ROBOT JOINT INCLUDING SUCH SEALING STRUCTURE

(71) Applicant: ABB Schweiz AG, Baden (CH)

(72) Inventors: Xiaodong Cao, Shanghai (CN); Jiajie Sha, Shanghai (CN); Kaiwei Chen, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/007,221

(22) PCT Filed: Sep. 10, 2020

(86) PCT No.: PCT/CN2020/114515
§ 371 (c)(1),
(2) Date: Jan. 27, 2023

(87) PCT Pub. No.: WO2022/051989
PCT Pub. Date: Mar. 17, 2022

(65) Prior Publication Data
US 2023/0243428 A1    Aug. 3, 2023

(51) Int. Cl.
*F16J 15/3252* (2016.01)
*B25J 17/00* (2006.01)
*B25J 19/00* (2006.01)

(52) U.S. Cl.
CPC ........... *F16J 15/3252* (2013.01); *B25J 17/00* (2013.01); *B25J 19/0066* (2013.01)

(58) Field of Classification Search
CPC ...... F16J 15/3252; F16J 15/32; F16J 15/3204; F16J 15/3248; B25J 17/00; B25J 19/0066
See application file for complete search history.

(56) References Cited

U.S. PATENT DOCUMENTS 9,333,656 B2    5/2016  Hahakura
10,011,026 B2 *  7/2018  Okada ..................... B25J 17/00
(Continued)

FOREIGN PATENT DOCUMENTS

CN    1727724 A    2/2006
CN    101134319 A   3/2008
(Continued)

OTHER PUBLICATIONS

International Search Report and Written Opinion; issued by the ISA/CN National Intellectual Property Administration; regarding corresponding patent application Serial No. PCT/CN2020/114515; dated May 27, 2021; 8 pages.

*Primary Examiner* — Gilbert Y Lee
(74) *Attorney, Agent, or Firm* — Greenberg Traurig, LLP

(57) ABSTRACT

Embodiments of the present disclosure provide a sealing structure for a robot joint. The sealing structure comprise a first sealing member adapted to be connected to a first part of the robot joint and a second sealing member adapted to be arranged between the first sealing member and a second part of the robot joint and in contact with the first sealing member. The first part is rotatable with respect to the second part. A material of the first sealing member is harder than the material of the second sealing member. With such a sealing structure, the reducer is closely sealed from the ambient environment. In this way, the leakage of the reducer can be prevented for an extended period even in harsh conditions and thereby the service life of the robot joint can be prolonged.

15 Claims, 3 Drawing Sheets

(56) References Cited

U.S. PATENT DOCUMENTS

| | | | |
|---|---|---|---|
| 2017/0217025 A1 | 8/2017 | Okada et al. |
| 2019/0126464 A1 | 5/2019 | Krumbacher |
| 2019/0305618 A1 | 10/2019 | Mizukoshi |
| 2019/0337165 A1 | 11/2019 | He et al. |

FOREIGN PATENT DOCUMENTS

| | | |
|---|---|---|
| CN | 109789566 A | 5/2019 |
| CN | 110228083 A | 9/2019 |
| CN | 110434893 A | 11/2019 |
| CN | 110944810 A | 3/2020 |
| CN | 111473117 A | 7/2020 |
| DE | 102015200374 A1 | 7/2016 |
| JP | 2011089609 A | 5/2011 |
| JP | 2017132016 A | 8/2017 |
| WO | 2018102965 A1 | 6/2018 |
| WO | 2020069653 A1 | 4/2020 |

\* cited by examiner

SEALING STRUCTURE FOR ROBOT JOINT AND ROBOT JOINT INCLUDING SUCH SEALING STRUCTURE

CROSS-REFERENCE TO RELATED APPLICATIONS

This is a national stage application claiming priority to International patent application Serial No.: PCT/CN2020/114515, filed on Sep. 10, 2020; which is herein incorporated by reference in its entirety.

FIELD

Embodiments of the present disclosure relate to a sealing structure for a robot joint, and to a robot joint including such a sealing structure.

BACKGROUND

Robots are increasingly being widely used in many different applications. A robot needs one or more robot joints to perform desired actions. To this end, a reducer is needed at a robot joint as one of the most expensive components of the robot joint. The durability of the reducer determines to a great extent the service life of the robot joint.

SUMMARY

Here it is proposed a sealing structure for a robot joint which can improve the sealing of its reducer, thereby reducing leakage from the reducer and thus extending the service life of the robot joint.

In a first aspect, a sealing structure for a robot joint is proposed. The sealing structure comprises a first sealing member and a second sealing member. The first sealing member is adapted to be connected to a first part of the robot joint while the second sealing member is adapted to be arranged between the first sealing member and a second part of the robot joint. The second sealing member is in contact with the first sealing member when arranged between the first sealing member and the second part of the robot joint. The first part is rotatable with respect to the second part. The material of the first sealing member is harder than the material of the second sealing member.

According to embodiments of the present disclosure, the proposed sealing structure forms a durable seal for the space where the reducer is disposed in the robot joint, even in harsh environments.

In some embodiments, the first sealing member of the sealing structure may be made of wear-resistant and corrosion-resistant material. In this case, the first sealing member may not rust or be worn, preventing occurrence of ground particles or other debris, like rust.

In some embodiments, the first sealing member of the sealing structure may be made of stainless steel or plated metal. In this way, the first sealing member can be easily machined into any desired contour.

In some embodiments, the first sealing member of the sealing structure may comprise an arm, and the second sealing member is adapted to be arranged on the arm. Such an arm can provide a suitable surface for the second sealing member to ride on. Hence, the second sealing member can be seated on a surface other than the outer circumferential surface of the first sealing member, thereby reducing the radial dimension of the sealing structure.

In some embodiments, the first sealing member of the sealing structure can also comprise an annular rib, and the annular rib and the arm are provided on opposite ends of the first sealing member. The annular rib can be received in a corresponding annular groove formed in the first part of the robot joint, thereby sealing the gap between the first sealing member and the first part of the robot joint.

In some embodiments, the first sealing member of the sealing structure may comprise a step sealing ring. In this way, the first sealing member can be easily connected to the first part of the robot joint via press fit.

In some embodiments, the first sealing member of the sealing structure may comprise an annular sealing ring. In this case, the second sealing member of the sealing structure can be arranged on the outer circumferential surface of the annular sealing ring. In this way, the resulting sealing structure can be reduced in its axial dimension.

In a second aspect, it is proposed a robot joint. The robot joint comprises a sealing structure in accordance with any embodiment in this application. Such robot joint can operate effectively for a prolonged period even in harsh circumstances. The reducer is well sealed from the ambient environment, so the leakage of the reducer is largely prevented.

It is to be understood that the Summary is not intended to identify key or essential features of embodiments of the present disclosure, nor is it intended to be used to limit the scope of the present disclosure. Other features of the present disclosure will become readily comprehensible through the description below.

BRIEF DESCRIPTION OF THE DRAWINGS

The above and other objectives, features and advantages of the present disclosure will become more apparent through more detailed description of example embodiments of the present disclosure in conjunction with the accompanying drawings, where in the example embodiments of the present disclosure, the same reference numerals usually represent the same components.

Throughout the drawings, the same or similar reference symbols are used to indicate the same or similar elements.

DETAILED DESCRIPTION

Over time, requirements for robots have been getting higher and higher. Most complaints from customers are about leakage of reducers. Unfortunately, some harsh environments can even accelerate the leakage. For example, in cases that the cleaning of robots requires the use of cleaning fluid, the cleaning fluid can degrade the seal of the reducer; in grinding application environments, water containing fine abrasive particles can splash to the joint and accelerate wear of the joint; in machining environments, cutting fluid can corrode seals of reducers; and in some relatively dirty environments, too much dust can accelerate wear of the seal of the reducer. In some sensitive environments, such as cleanrooms or hygienic places, customers care more about contamination caused by leakage of oil out of robots.

Conventionally, to prevent leakage from a reducer a sealing structure for the space for reducer in a robot joint has been provided which usually employs a slit seal or one single sealing member and thus attempts to separate the space for reducer from the ambient surroundings. Such sealing structure can be unreliable in some cases. Most recently, a sealing structure adopting two spaced-apart sealing members has been provided. This kind of sealing structure has better sealing effects than those employing the slit seal or one single sealing member. However, it functions poorly in relatively harsh surroundings.

In order to address the above and potentially other problems, the inventors here propose an improved sealing structure that can provide better sealing effects over extended periods, even in harsh environments, compared to the existing sealing structures. This improved sealing structure is structurally different from the existing sealing structures, which at least partially contributes to its improved sealing effects.

Sprits and principles of the present disclosure will now be discussed in detail with reference to several example embodiments. It is to be understood these embodiments are discussed only for the purpose of enabling those persons of ordinary skill in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or the same objects. Other definitions, explicit and implicit, may be comprised below. A definition of a term is consistent throughout the description unless the context clearly indicates otherwise.

Figure 1:
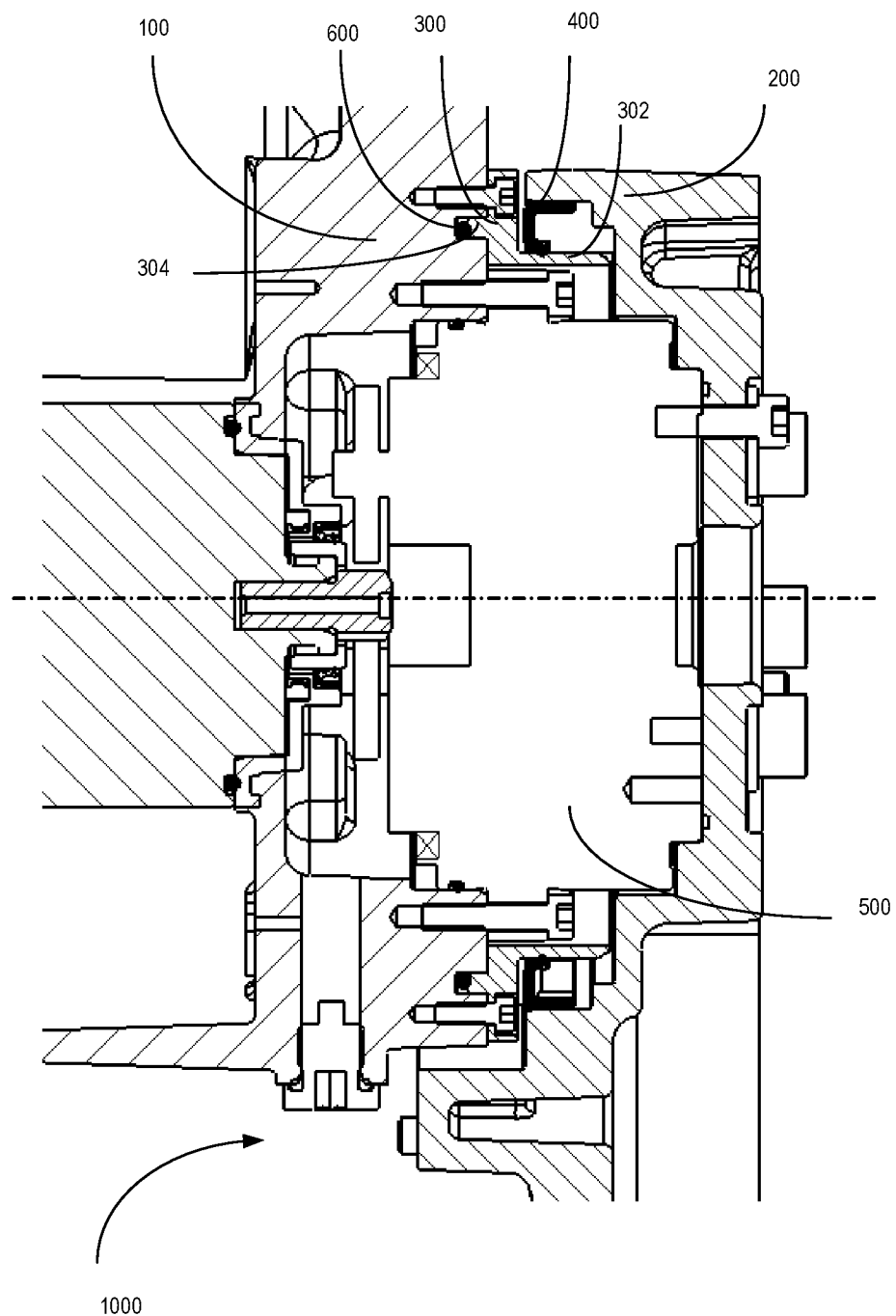
FIG. 1 is a schematic cross-sectional view of a robot joint with a sealing structure, in accordance with an example embodiment of the present disclosure.

As shown in FIG. 1, a reducer 500 is provided at a robot joint 1000 to allow a first part 100 of the robot joint 1000 to rotate relative to a second part 200 of the robot joint 1000 in a desired manner. The reducer 500 is contained in a space enclosed by the first part 100 and the second part 200. In some embodiments, the first part 100 can be a base of the robot joint 1000, and the second part 200 can be a housing of the robot joint 1000, or vice versa. In some embodiments, the first part 100 can be a turn table, and the second part 200 can be an arm driven to rotate with respect to the turn table, or vice versa.

FIG. 1 shows a schematic cross-sectional view of a robot joint 1000 with a sealing structure in accordance with an embodiment of the present disclosure. A first sealing member 300 is connected to the first part 100. The first sealing member 300 may be connected to the first part 100 through any suitable manners, such as screws, glue, press fit, and so on. In the embodiment as shown in FIG. 1, the first sealing member 300 is connected by means of screws. In some embodiments, the first sealing member 300 can be connected to the second part 200 instead of the first part 100.

In some embodiments, the first sealing member 300 may be implemented as a sealing ring. In the embodiment as shown in FIG. 1, the first sealing member 300 has an annular rib 304 received in a corresponding groove formed in the first part 100. The annular rib 304 can facilitate pre-positioning of the first sealing member 300 and seals a gap between the first part 100 and the first sealing member 300. In some embodiments, the first sealing member 300 can be formed without the annular rib 304 and the first part 100 can then be formed without the corresponding groove accordingly.

In some embodiments, an optional O-ring 600 is provided between the bottom of the groove and the first sealing member 300 to help seal the gap between the first part 100 and the first sealing member 300. In some embodiments, in addition to or as an alternative to the O-ring 600, the gap between the first sealing member 300 and the first part 100 can be sealed in other ways, such as by using gaskets or glue.

As also shown in FIG. 1, the first sealing member 300 has a projecting arm 302 on the opposite end of the first sealing member 300 from the rib 304. The arm 302 and the rib 304 extend in opposite directions. The arm 302 extends longitudinally and provides a surface on which a second sealing member 400 can be arranged. The second sealing member 400 can be any seals that are suitable for rotational sealing, such as oil seals, Pan plug seals/variseals, Glyd-rings/lattice rings, v-rings, etc. The material of the second sealing member 400 is softer than that of the first sealing member 300. In other words, the first sealing member 300 is made of a material harder than the material of the second sealing member 400.

The second sealing member 400 is arranged on the surface of the projecting arm 302 of the first sealing member 300 and in contact with the first sealing member 300. The second part 200 is arranged in such a way that the second part 200 and the arm 302 of the first sealing member 300 sandwich the second sealing member 400. The second part 200 can be installed to the first part 100 in conventional ways. In this way, the first sealing member 300 and the second sealing member 400 form a sealing structure that closely seals the space between the first part 100 and the second part 200 where the reducer 500 is contained. With the second sealing member 400 being arranged on the arm 302, the radial dimension perpendicular to the axis of rotation between the first part 100 and the second part 200 of the sealing structure can be reduced.

Figure 2:
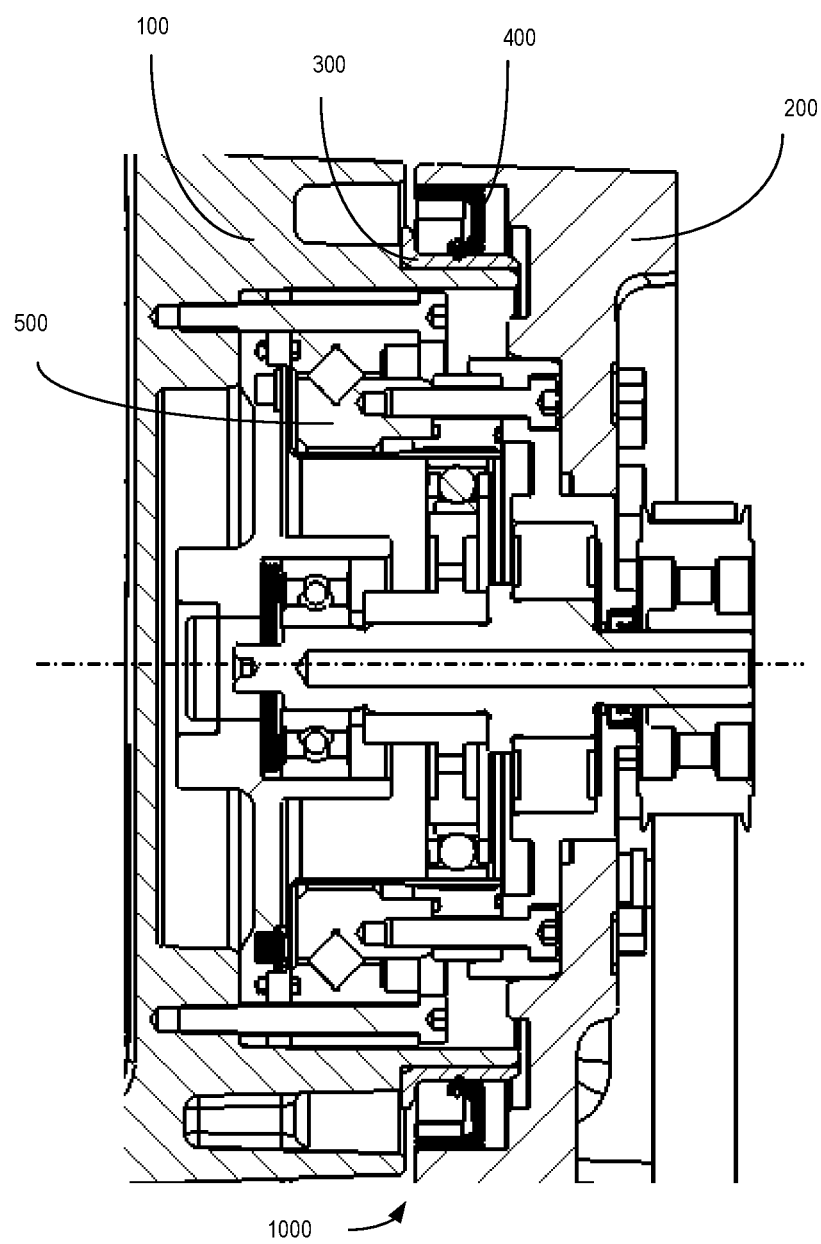
FIG. 2 is a schematic cross-sectional view of a robot joint with a sealing structure, in accordance with another example embodiment of the present disclosure.
Figure 3:
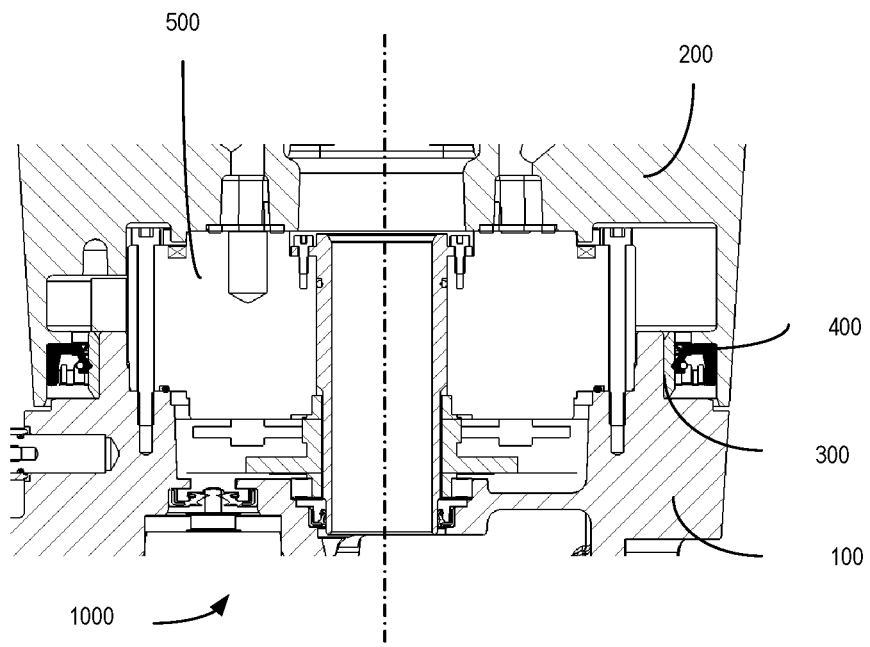
FIG. 3 is a schematic cross-sectional view of a robot joint with a sealing structure, in accordance with yet another example embodiment of the present disclosure.
Figure 4:
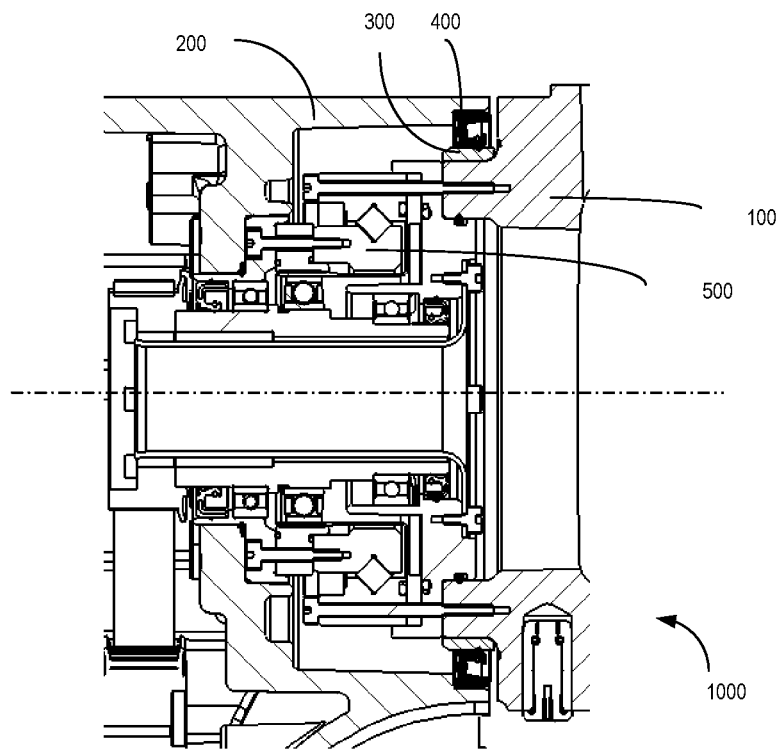
FIG. 4 is a schematic cross-sectional view of a robot joint with a sealing structure, in accordance with yet another example embodiment of the present disclosure.

The first sealing member 300 can be of any suitable cross section. As shown in FIG. 2, the first sealing member 300 may be formed as a step ring for press fit on the first part 100. In this case, glue may be used for sealing the gap between the first part 100 and the first sealing member 300. The sealing ring may be formed without the arm. As shown in FIGS. 3 and 4, the first sealing member 300 may be formed as an annular sealing ring and is used with different kinds of second sealing members 400 at different robot joints 1000. The second sealing member 400 may be in contact with the first sealing member 300 around the outer circumferential surface of the first sealing member 300. In this way, the axial dimension along the axis of rotation between the first part 100 and the second part 200 of the resulting sealing structure can be reduced.

In some embodiments, the first sealing member 300 is made of wear-resistant and corrosion-resistant materials. In this way, occurrence of ground particles or other debris, such as rust, can be avoided. By way of example, in some embodiments, the first sealing member 300 is made of stainless steel or plated metals. This allows the sealing ring to be easily machined.

With the sealing structure according to embodiments of the present disclosure, the space for the reducer is well sealed and protected from the surroundings. As a result, the seal of a reducer itself is protected even when robots are used in harsh environments, thereby preventing oil leakage and thus increasing the service life of the reducers. Since reducers are among the most expensive components of a robot joint, extending service life of a reducer is bound to increase customer satisfaction.

Additionally, the sealing structure according to the present disclosure can also prevent contamination of the external environment by oil leakage when robots are used in clean environments, such as cleanrooms and hygienic environments. In addition, the sealing structure according to the present disclosure can prevent rust on the surface of the reducer or other dirt hidden in the reducer space from contaminating the external environment.

It should be appreciated that the above detailed embodiments of the present disclosure are provided only to exemplify or explain principles of the present disclosure and not to limit the present disclosure. Therefore, any modifications, equivalent alternatives and improvements, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A sealing structure for a robot joint, comprising:
    a first sealing member comprising a first end and a second end opposite the first end, the first end of the first sealing member configured to be connected to a first part of the robot joint, the first sealing member comprising:
        a ring having an outer circumference axially extending between the first end and the second end of the first sealing member,
        a rib axially extending from the ring in a first direction towards the first end of the first sealing member, the rib configured to be received in a corresponding groove in the first part of the robot, and
        an arm axially extending from the ring in a second direction opposite from the first direction and towards the second end of the first sealing member, the arm having a reduced radial dimension than the outer circumference of the ring; and
    a second sealing member configured to be arranged on an outer circumferential surface of the arm and between the first sealing member and a second part of the robot joint connected to the first part of the robot joint;
    wherein, when installed to the first part of the robot joint, the second part of the robot joint is positioned adjacent the second end of the first sealing member such that the first part and the second part define a space configured to contain a reducer therein, the reducer configured to allow the first part of the robot joint to rotate with respect to the second part of the robot joint and the first sealing member,
    wherein a material of the first sealing member is harder than a material of the second sealing member.

2. The sealing structure according to claim 1, wherein the first sealing member is made of wear-resistant and corrosion-resistant material.

3. The sealing structure according to claim 2, wherein the first sealing member is made of stainless steel or plated metal.

4. The sealing structure according to claim 1, wherein the rib comprises an annular rib, and the annular rib and the arm being provided on opposite ends of the first sealing member.

5. The sealing structure according to claim 1, wherein the first sealing member comprises a step sealing ring.

6. The sealing structure according to claim 1, wherein the first sealing member comprises an annular sealing ring.

7. A robot joint comprising the sealing structure according to claim 1.

8. A robot joint comprising the sealing structure according to claim 2.

9. A robot joint comprising the sealing structure according to claim 3.

10. A robot joint comprising the sealing structure according to claim 4.

11. A robot joint comprising the sealing structure according to claim 5.

12. A robot joint comprising the sealing structure according to claim 6.

13. The sealing structure according to claim 4, wherein the annular rib is configured to be received in the corresponding groove formed in the first part.

14. The sealing structure according to claim 13, wherein the annular rib is configured to seal a gap between the first part and the first sealing member at the corresponding groove.

15. The sealing structure according to claim 13, further comprising:
    an O-ring located between a bottom of the corresponding groove of the first part and the annular rib.

* * * * *